United States Patent

Song

[11] Patent Number: 5,933,405
[45] Date of Patent: Aug. 3, 1999

[54] SLIDING ACTUATOR OF A DIGITAL VERSATILE DISC PLAYER CAPABLE OF SMOOTHLY MOVING AN OBJECT LENS

[75] Inventor: Ki-Seok Song, Seoul, Rep. of Korea

[73] Assignee: Daewoo Electronics Co., Ltd., Seoul, Rep. of Korea

[21] Appl. No.: 08/866,127

[22] Filed: May 30, 1997

[30] Foreign Application Priority Data

Dec. 30, 1996 [KR] Rep. of Korea .................. 96-63326 U

[51] Int. Cl.⁶ .................................................. G11B 17/00
[52] U.S. Cl. ............................................................ 369/244
[58] Field of Search ................................ 369/244, 44.12, 369/44.15, 44.16, 44.22, 219; 359/814

[56] References Cited

U.S. PATENT DOCUMENTS

| 5,056,891 | 10/1991 | Masunaga | 359/813 |
| 5,488,603 | 1/1996 | Tomita et al. | 369/219 |
| 5,526,340 | 6/1996 | Tanaka | 369/219 |
| 5,663,841 | 9/1997 | Akiba et al. | 359/814 |

FOREIGN PATENT DOCUMENTS

| 0 333 601 | 9/1989 | European Pat. Off. |  |
| 59-185042 | 10/1984 | Japan . |  |
| 1-184635 | 7/1989 | Japan . |  |
| 1-184636 | 7/1989 | Japan . |  |
| 4-349223 | 12/1992 | Japan . |  |

Primary Examiner—John H. Wolff
Assistant Examiner—Kenneth W Fields
Attorney, Agent, or Firm—Pillsbury Madison & Sutro LLP

[57] ABSTRACT

An actuator for a digital versatile disc player which includes a lens holder to which object lenses are mounted, a tracking coil which is attached to an outer surface of the lens holder for tracking the lens holder, a focusing coil which is attached to the outer surface of the lens holder for focusing the lens holder, a yoke plate which magnetically interacts with the tracking and focusing coils, and supporting portions which movably support the lens holder, and to which the yoke plates are mounted. The supporting portions include a plurality of magnets and a pair of suspension plates, and the lens holder is floated with respect to the yoke plate by repelling forces between the magnets. The tracking and focusing functions are smoothly accomplished and external impacts are effectively absorbed by the floating of the suspension plates which support the lens holder.

4 Claims, 4 Drawing Sheets

SLIDING ACTUATOR OF A DIGITAL VERSATILE DISC PLAYER CAPABLE OF SMOOTHLY MOVING AN OBJECT LENS

BACKGROUND OF THE INVENTION

1. Field of the Invention

The present invention relates to an optical pick-up device of a digital versatile disc player, and more particularly to an actuator which operates an optical pick up device.

2. Description of the Prior Art

An optical pick-up device is used in an optical disc player in order to record and reproduce information on and from an optical disc by using a laser beam. In general, an optical pick-up device includes a light source, a beam splitter which reflect a laser beam radiated from the light source toward an object lens, an object lens which focuses the laser beam on an optical disc surface, and a receiving device which receives the laser beam reflected on the optical disc surface. The optical disc device reads the information from the optical disc when it moves in the radial direction of the optical disc.

The information is recorded on tracks which are formed concentrically or spirally on the optical disc, and includes a plurality of pits. The sizes of the pits and the intervals of the tracks or pitches of optical discs are different from one another, depending on the types of the optical discs. In order to converge the laser beam on the pits, the optical pick-up device should move between the tracks accurately. The conversion of the laser beam on the pits is called "focusing", and the movement of the optical pick-up between the tracks is called "tracking". The focussing and the tracking of the optical pink-up device is accomplished by an actuator.

The optical pick-up device detects servo error signals comprising focusing error signals and tracking error signals by using laser beams reflected on the tracks, and the actuator drives the object lens in the focusing and tracking directions based on the servo error signals detected by the optical pick-up device. For the focusing of the optical pick-up device and for the tracking of the optical pick-up device in the radial direction of the optical disc, the actuator moves the optical pick-up device vertically with respect to the optical pick-up device.

Generally, a compact disc (hereinafter, referred to as a CD) is used as an optical disc for audio systems of a computer or a multimedia or for listening to music. The CD has advantages in that fewer errors are generated in the CD than in a floppy disc and in that the CD is more solid than the floppy disc, so is currently widely used as an information storing media currently. However, the amount of the information recorded on the CD is limited, and it is not suitable for moving pictures such as movies. A digital versatile disc (hereinafter, referred to as a DVD) has been developed in order to settle the above-mentioned problems of the CD. In the DVD, more information can be recorded than in the CD, the sizes of the pits on which information are recorded is smaller than those of the CD, and the pitches defined by the pits of the DVD are shorter than those of the CD.

Therefore, it is impossible to read information from a DVD by a reproducing device for CD. A reproducing device for DVD includes an optical pick-up device which can read information of both a CD and a DVD, the focussing and the tracking of the optical pick-up device being accomplished by an actuator.

FIG. 1 is an exploded perspective view for showing a conventional actuator for a DVD player. As shown in FIG. 1, the conventional actuator for a DVD player comprises a lens holder 14 which includes first and second object lens 11 and 12 for reading information from a CD or a DVD, focusing and tracking coils 15 and 16 which respectively accomplishes the focusing and the tracking functions of the first and second object lenses 11 and 12, and a yoke plate 18 which is connected to the lens holder 14 by a shaft 17.

The focusing and tracking coils 15 and 16 are mounted on the outer surface of the lens holder 14, and focusing and tracking magnets 19 which are respectively in magnetic conjunction with the focusing and tracking coils 15 and 16 are fixed to the yoke plate 18. The first and second object lenses 11 and 12 are focused by the focusing coil 15 and the focusing magnet 19 and then tracked by the tracking coil 16 and the tracking magnet 20, and the information is read by the CD or the DVD.

The shaft 17 which connects the lens holder 14 to the yoke plate 18 is inserted into a sleeve 13 which is formed on the lens holder 14. When the focusing coil 15 and the focusing magnet 19 are in magnetic conjunction with each other, the lens holder 14 moves along the length of the shaft 17 in order to focus the first and second object lenses 11 and 12, and the inner surface or the sleeve 13 then frictionally contacts with the shaft 17. The diameter of the sleeve 13 is enlarged by the frictional contact between the inner surface of the sleeve 13 and the shaft 17. Therefore, in order to prevent the enlargement of the diameter of the sleeve 13, the inner surface of the sleeve 13 and the outer surface of the shaft 17 are coated with a material whose frictional coefficient is small.

However, the coated layers of the sleeve 13 and the shaft 17 are gradually removed by the repetition of the focusing of the object lenses 11 and 12. As a result, since the friction force between the shaft 17 and the sleeve 13 is increased over time, thereby enlarging the diameter of the sleeve 13, the object lenses 11 and 12 does not accurately accomplish the focusing function thereof. Further, if external impacts are applied to the actuator 10, errors are generated when the object lenses 11 and 12 accomplish their focusing and tracking functions.

FIG. 2 shows a conventional actuator 30 which is disclosed in U.S. Pat. No. 4,866,690 issued to Takuya Tamaru et al. on Sep. 12, 1989 and entitled "Vibration Imparted Focus Search Device in an Optical Type Disc Playback Device".

The actuator 30 of Tamaru comprises a cylindrical lens holder 32 in which a sleeve 33 is formed, focusing and tracking coils 34 and 36 which are mounted on the outer surface of the lens holder 32, and a yoke plate which is inserted into the sleeve 33 and includes a shaft 58 for supporting the lens holder 32. On the outer surface of the lens holder 32 is connected a damper 38 which has a damper sleeve 40.

A plurality of yokes 52 are formed on the upper surface of the yoke plate 50, and between the opposing two yokes is fixed a plurality of magnets 54 which operate in magnetic conjunction with the focusing and tracking coils 34 and 36. On the upper surface of the yoke plate 50 is formed a damper shaft 56 which is inserted into the damper sleeve 40. The lens holder 32 is supported by the shaft 58 and the damper shaft 56.

According to the actuator 30 of Tamaru the shaft 58 is inserted into the damper sleeve 40 which is formed along the rotating axis of the lens holder 32, and rotatably and slidably supports the lens holder 32 with respect to the yoke plate 50.

The reference position of the lens holder 32 is determined in such a manner that the side surface of the tracking coil 36 is separated from yokes which are opposed to the magnets 54.

When a focusing servo (not shown) is switched ON, focusing control is accomplished, and when the focusing servo is switched OFF, the lens holder 32 returns to the reference position thereof by the damper 38 and slowly moves along the axis thereof. Then, a tracking servo (not shown) is switched OFF, and an AC voltage from an oscillator is applied to the tracking coil 36, and vibration is thus transferred to the lens holder 32 in the rotating direction of the lens holder 32 with respect to the rotating axis. The vibration enables the lens holder 32 to slide, thereby preventing stick slips between the shaft 33 and the sleeve.

However, the actuator 30 of Tamaru needs a separate vibrating imparting device for smooth sliding of the lens holder 32. Further, the actuator 30 has a disadvantage in that it cannot absorb external impacts.

SUMMARY OF THE INVENTION

Therefore, it is an object of the present invention to provide an actuator of a digital versatile disc player which can absorb external impacts and enables the object lens to move smoothly.

In order to achieve the above object of the present invention, there is provided an actuator for a digital versatile disc player, which comprises:

- a lens holder to which first and second object lenses are mounted, the lens holder having a pair of insertion recesses on both sides thereof;
- a tracking coil attached to an outer surface of the lens holder, for tracking the lens holder;
- a focusing coil attached to the outer surface of the lens holder, for focusing the lens holder;
- a yoke plate having a through hole through which a laser beam is passed toward the first and second object lenses, the yoke plate including a plurality of yokes separated from the tracking and focusing coils and the plurality of magnets attached to inner surfaces of the corresponding yoke for magnetically interacting with the tracking and focusing coil; and
- supporting means for movably supporting the lens holder by floating the lens holder with respect to the yoke plate and for absorbing external impacts.

In a preferred embodiment of the present invention, the supporting means comprises:

- a pair of guide housings respectively formed on both ends of the yoke plate, each guide housing having an inner wall one side of which is opened;
- a pair of suspension plates for supporting the lens holder, each suspension plate being inserted into the corresponding recess and the corresponding guide housing at one end and the other end thereof respectively;
- vertical weight supporting means installed in the interiors of the guide housing, for supporting a vertical weight of the lens holder; and
- horizontal weight supporting means installed in the interiors of the guide housing for supporting a horizontal weight of the lens holder.

The vertical weight supporting means includes a pair of first damping magnets each embedded on a bottom surface of the corresponding guide housing, and a pair of second damping magnets each mounted to a bottom surface of the other end of the corresponding suspension plate such that one end of the second damping magnet is opposed to the end of the corresponding first damping magnet having the same polarity as the end of the first damping magnet so as to create a repelling force between the first and second damping magnets, each suspension of the plates being floated with respect to the yoke plate by the repelling force created between the corresponding first and second damping magnets.

The suspensions are repelled from the yoke plates and the guide housings so that the actuator effectively may present the errors generated by friction during the focusing and tracking operations and so that the lens holder may be smoothly moved without any contact. Further, the supporting member can absorb external impacts effectively, thereby focusing and tracking errors due to the impacts.

BRIEF DESCRIPTION OF THE DRAWINGS

The above object and outer advantages of the present invention will become more apparent by describing in detail preferred embodiments thereof with reference to the attached drawings in which.

DETAILED DESCRIPTION OF THE INVENTION

Hereinafter, a preferred embodiment of the present invention will be explained in more detail with referece to the accompanying drawings.

Figure 1:
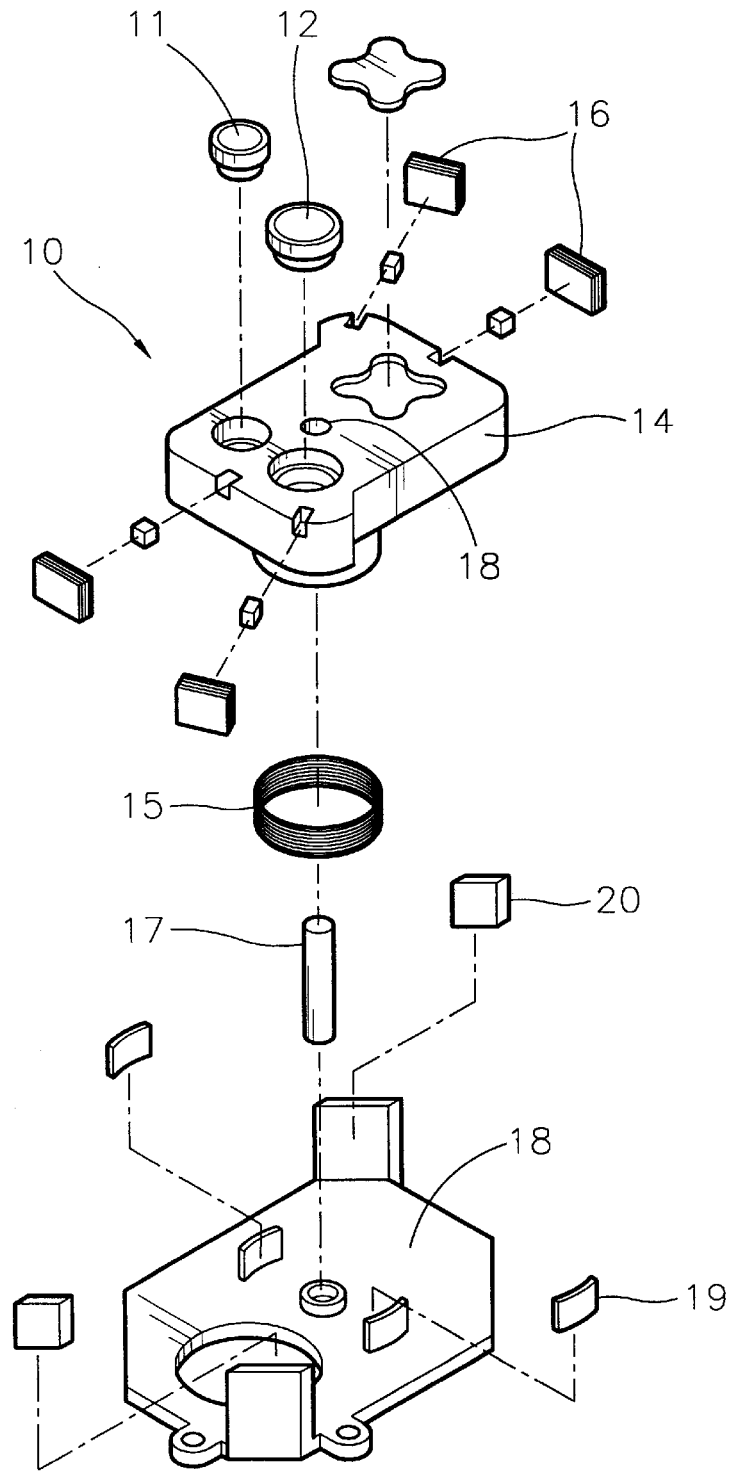
FIG. 1 is an exploded perspective view for showing a conventional actuator for a DVD player.
Figure 2:
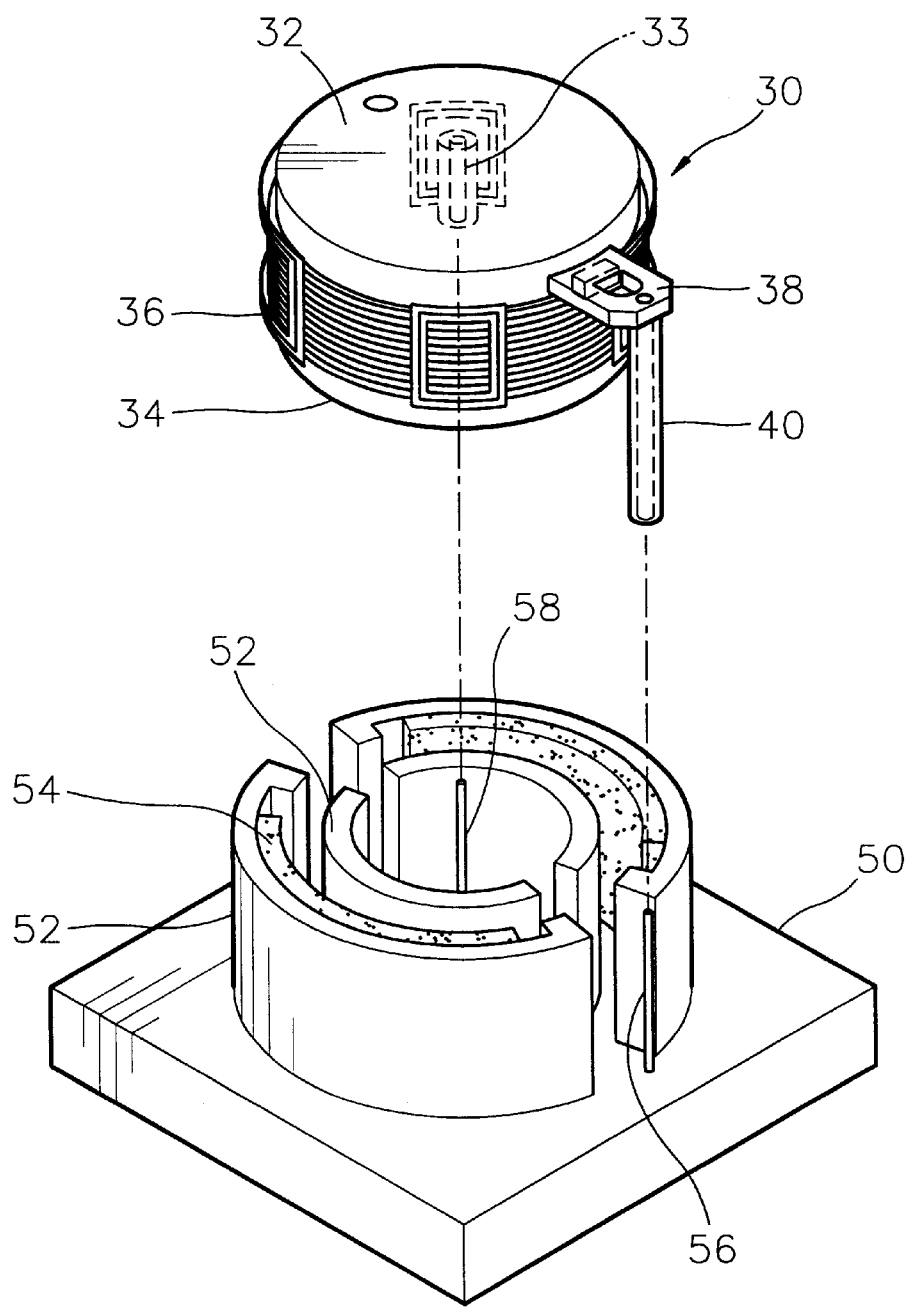
FIG. 2 is an exploded perspective view for a conventional actuator for an optical disc player.
Figure 3:
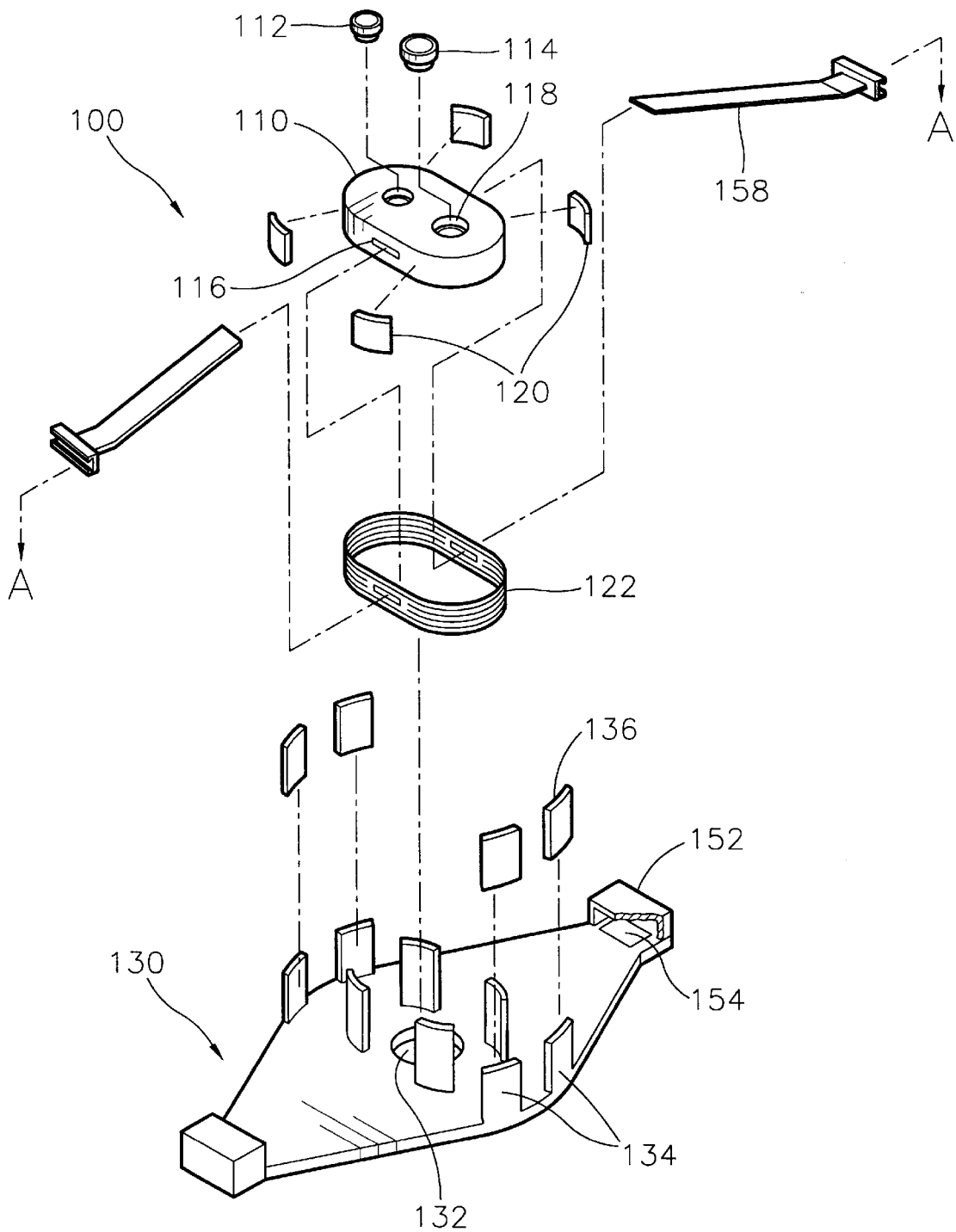
FIG. 3 is an exploded perspective view for show an actuator for a DVD player according to a preferred embodiment of the present invention.
Figure 4:
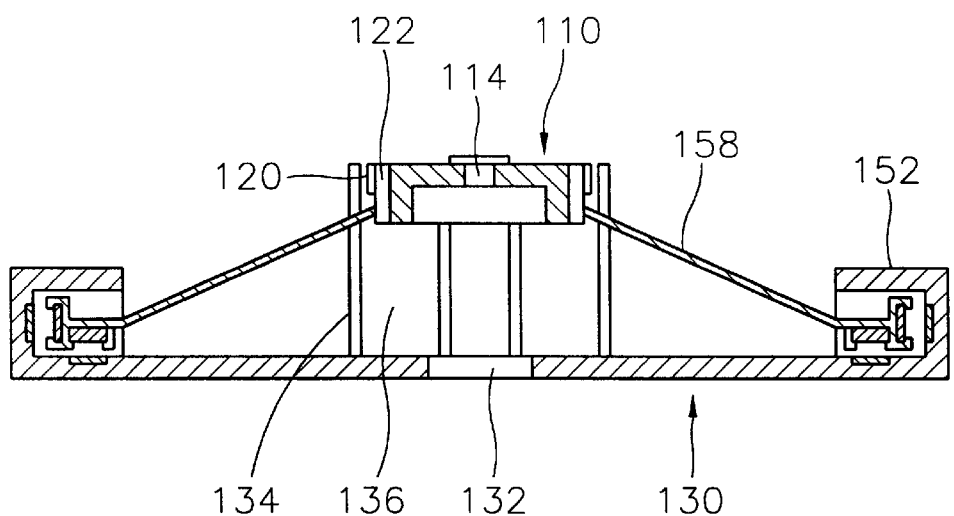
FIG. 4 is a cross sectional view of the actuator of FIG. 3 which is cut off along the line A—A shown in FIG. 3.
Figure 5:
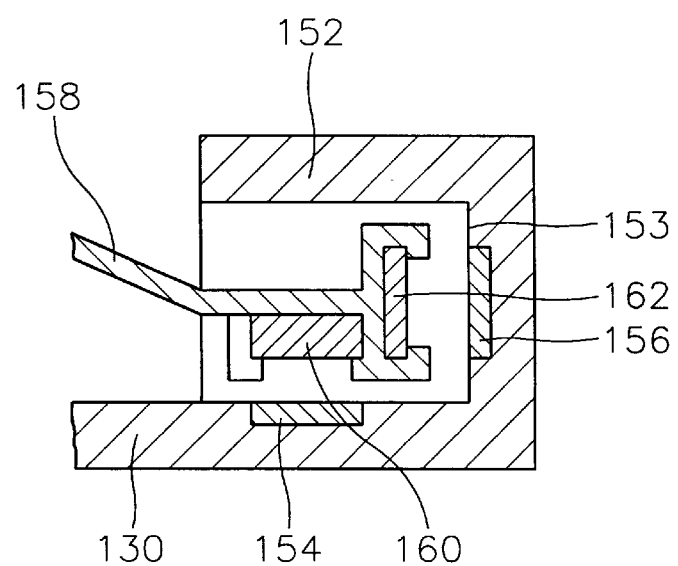
FIG. 5 is an enlarged sectional view for showing the portion B shown in FIG. 4.

FIGS. 3 through 5 are exploded perspective views which show an actuator 100 for a digital versatile disc player according to a preferred embodiment of the present invention. Referring to the FIGS. 3 through 5, the actuator 100 according to the preferred embodiment of the present invention comprises a lens holder 110, to which first and second object lenses 112 and 114 are mounted, and which has a pair of insertion recesses 116 on the both sides thereof, a tracking coil 120 which is attached to the outer surface of the lens holder 110 for tracking the lens holder 110, a focusing coil 122 which is attached to the outer surface of the lens holder 110 and focuses the lens holder 110, a yoke plate 130 which has a plurality of yokes 134 separated from the tracking and focusing coils 120 and 122, and a suspension portion 150 which movably supports the lens holder 110 and absorbs external impacts.

Lens recesses 118 to which the first and second object lenses 112 and 114 are respectively mounted are formed in the lens holder 110. Focusing distances of the first and second object lenses 112 and 114 are different from each other, and the first object lens 112 is used to read information from the CD and the second object lens 114 is used to read information from the DVD.

The tracking and focusing coils 120 and 122 are attached to the outer surface of the lens holder 110. The lens holder 110 is surrounded by the focusing coil 122, and the tracking coil 120 is attached to both sides of the leas holder 110.

A through-hole 132 through which a laser beam is passed is formed in the yoke plate 130 at the center portion of the yoke plate 130, a plurality of yokes 134 are protruded from the yoke plate 130 so that the opposing two yokes 134 are opposed to each other. To the inner surface of the plurality of yokes 134 are attached the plurality of magnets 136, each or which is in magnetic conjunction with the corresponding yoke 134. When current is applied to the tracking and focusing coils 120 and 122, the lens holder 110 accomplishes the focusing and tracking functions thereof by the magnetic conjunction between the coils 120 and 122 and the magnets 136.

The suspension portion 150 comprises guide housings 152 which are respectively formed on both ends of the yoke plate 130, and each of which are opened at one end thereof, first damping magnets 154 which are embedded on the bottom surface of the corresponding guide housings 152, first support mnagnets 156 which are attached to inner surfaces 153 of the corresponding guide housings 152, a pair of suspension plates 158 for supporting the lens holders 110, each of which has one end inserted into the corresponding insertion recess 116 and the other end inserted into the corresponding guide housing 152, second damping magnets 160 which are mounted to the bottom surfaces of the other ends of the corresponding suspension plates 158 and magnetically repel the corresponding first damping magnets 154, and second support magnets 162 which are mounted to the other ends of corresponding suspension plates 158 and magnetically repel the corresponding first support magnets 156.

The first and second damping magnets 154 and 160 are installed such that one end of each first damping magnet 154 is opposed to the end of the corresponding second damping magnet 160 which has the same polarity as the end of the first damping magnet 154 so as to create a repelling force between the first and second damping magnets 154 and 160, thereby floating the suspension plates 158 from the yokes plate 130. The first and second support magnets 156 and 162 are installed such that one end of each first support magnet 156 is opposed to the end of the corresponding second support magnet 162 which has the same polarity as the end of the first support magnet 156 so as to create a repelling force between the first and second support magnets 156 and 162, thereby preventing the contact between the suspension plates 158 and the inner surface 153 of the corresponding guide housings 152. Therefore, the suspension plates 158 float in the guide housings 152 by the first and second damping magnets 154 and 160 and by the first and second support magnets 156 and 162. The repelling forces created by the first and second damping magnets 154 and 160 and the first and second support magnets 156 and 162 are slightly weaker, than the weights of the suspension plates 158, and function as magnetic bearings for absorbing the external impacts.

Hereinafter, the operation of the actuator 100 for a DVD player according to the above-mentioned preferred embodiment of the present invention, will be described.

The weight of the lens holder 110 is divided into a vertical weight which is vertically exerted with respect to the yoke plate 130 through the suspension plates 158, and a horizontal weight which is horizontally exerted with respect to the yoke plate 130. The vertical weight of the lens holder 110 is supported by the repelling forces between the first and second damping magnets 154 and 160, the horizontal weight is supported by the first and second support magnets 156 and 162, and the lens holder 110 floats by a distance from the yoke plates 130 in the guide housing 152.

When current is applied to the focusing coil 122 by the focusing servo (not shown), the lens holder 110 supported by the first and second damping magnets 154 and 160 and the first and second support magnets 156 and 162 is moved upward and downward with respect to the yoke plate 130 and accomplishes the focusing function thereof. When current is applied to the tracking coil 120 by the tracking servo (not shown), the lens holder 110 supported by the first and second damping magnets 154 and 160 and the first and second support magnets 156 and 162 is moved horizontally with respect to the yoke plate 130 and accomplishes the tracking function thereof. When the focusing and tracking functions of the lens holder 110 are accomplished, since the suspension plates 158 do not make contact with the guide housings 152 and the yoke plate 130, the lens holder 110 is smoothly moved.

Further, when external forces are exerted to the actuator 100, since the suspension plates 158 floating with respect to the yoke plate 130 vibrate and absorb external impacts, damage to the actuator 100 is prevented.

As above-described, according to the sliding actuator for the DVD player, the object lens can be smoothly moved without any contact, and can absorb external impacts effectively. Further, the structure of the actuator is so simple that the actuator is easily embodied. Furthermore, the actuator effectively presents the errors generated by friction during the focusing and tracking operations.

Although the preferred embodiment of the invention has been described, it is understood that the present invention should not be limited to these preferred embodiments, but various changes and modifications can be made by one skilled in the art within the spirit and scope of the invention as hereinafter claimed.

What is claimed is:

1. An actuator for a digital versatile disc player, which comprises:

a lens holder to which first and second object lenses are mounted, the lens holder having a pair of insertion recesses on both sides thereof;

a tracking coil attached to an outer surface of the lens holder, for tracking the lens holder;

a focusing coil attached to the outer surface of the lens holder, for focusing the lens holder;

a yoke plate having a through-hole through which a laser beam is passed toward the first and second object lenses, the yoke plate including a plurality of yokes separated from the tracking and focusing coils and a plurality of magnets attached to inner surfaces of the corresponding yoke for magnetically interacting with the tracking and focusing coils; and supporting means for movably supporting the lens holder by floating the lens holder with respect to the yoke plate and for absorbing external impacts, wherein the supporting means comprises:

a pair of guide housings respectively formed on both ends of the yoke plate, each guide housing having an inner wall, one side of which is opened;

a pair of suspension plates for supporting the lens holder, each suspension plate being inserted into a corresponding recess and a corresponding guide housing at one end and the other end thereof, respectively;

vertical weight supporting means installed in the interiors of the guide housings, for supporting a vertical weight of the lens holder; and horizontal weight supporting means installed in the interiors of the guide housings, for supporting a horizontal weight of the lens holder, and wherein the vertical weight supporting means includes a pair of first damping magnets each embedded on a bottom surface of the corresponding guide housing, and a pair of second damping magnets each mounted to a bottom surface of the other end of the corresponding suspension plate such that one end of the second damping magnet is opposed to the end of the corresponding first damping magnet having the same polarity as the end of the first damping magnet so as to create a repelling force between the first and second damping magnets, each suspension of the plates being floated with respect to the yoke plate by the repelling force created between the corresponding first and second damping magnets.

2. An actuator for a digital versatile disc player according to claim 1, wherein the repelling forces created between the corresponding first and second damping magnets are weaker than the vertical weight of the lens holder.

3. An actuator for a digital versatile disc player according to claim 1, wherein the horizontal weight supporting means includes a pair of first support magnets each attached to the inner wall of the corresponding guide housing, and a pair of second support magnets each mounted to the other end of the corresponding suspension plate such that one end of the second support magnet is opposed to the end of the corresponding first support magnet having the same polarity as the end of the first support magnet so as to create a repelling force between the first and second support magnets, each of the suspension plates being separated from the inner wall of the guide housing by the repelling force created between the corresponding first and second support magnets.

4. An actuator for a digital versatile disc player according to claim 3, wherein the repelling forces created between the corresponding first and second support magnets are weaker than the horizontal weight of the lens holder.

* * * * *